United States Patent [19]
Schmidt, Jr.

[11] Patent Number: 5,711,711
[45] Date of Patent: Jan. 27, 1998

[54] METHOD OF MANUFACTURING A FASTENER ASSEMBLY WITH AXIALLY CAPTIVATED WASHER

[75] Inventor: Rudolph Schmidt, Jr., Nicholasville, Ky.

[73] Assignee: Crest Products, Inc., Lexington, Ky.

[21] Appl. No.: 544,451

[22] Filed: Nov. 17, 1995

Related U.S. Application Data

[62] Division of Ser. No. 254,644, Jun. 8, 1994, Pat. No. 5,489,177.

[51] Int. Cl.$^6$ ............................................. B21D 53/20
[52] U.S. Cl. ............................................................. 470/41
[58] Field of Search .............................. 470/2, 3, 41, 42, 470/162, 163, 48, 49, 52

[56] References Cited

U.S. PATENT DOCUMENTS

| | | |
|---|---|---|
| 1,674,258 | 6/1928 | Obergfell et al. . |
| 2,132,636 | 10/1938 | Maahs . |
| 2,255,948 | 9/1941 | Swanstrom ........................ 411/303 |
| 2,275,315 | 3/1942 | Ray . |
| 2,283,494 | 5/1942 | Erdman . |
| 2,303,224 | 11/1942 | Olson . |
| 2,487,129 | 11/1949 | Hallock ............................. 411/324 |
| 2,672,069 | 3/1954 | Mitchell ............................ 411/368 |
| 2,779,376 | 1/1957 | Poupitch . |
| 2,792,578 | 5/1957 | Autio . |
| 2,817,380 | 12/1957 | Knohl . |
| 3,016,941 | 1/1962 | Coldren . |
| 3,062,253 | 11/1962 | Millheiser . |
| 3,138,188 | 6/1964 | Tuozzo et al. . |
| 3,196,733 | 7/1965 | Cohen et al. . |
| 3,204,680 | 7/1965 | Barry . |
| 3,209,806 | 10/1965 | Currier et al. . |
| 3,221,794 | 12/1965 | Acres . |
| 3,315,720 | 4/1967 | Gutshall . |
| 3,358,548 | 12/1967 | Dyslin . |
| 3,465,803 | 9/1969 | Ernest et al. . |
| 3,502,130 | 3/1970 | Gulistan . |
| 3,525,108 | 8/1970 | Holton ................................ 470/2 |
| 3,556,570 | 1/1971 | Cosenza . |
| 3,622,194 | 11/1971 | Bryk . |
| 3,699,841 | 10/1972 | Lanius, Jr. . |
| 3,777,796 | 12/1973 | Takano . |
| 3,837,212 | 9/1974 | Gutshall . |
| 3,862,458 | 1/1975 | Stanaitis . |
| 3,869,219 | 3/1975 | Wilson et al. . |
| 3,877,341 | 4/1975 | Grimm ............................... 411/437 |
| 4,115,912 | 9/1978 | Beck . |
| 4,174,008 | 11/1979 | Preziosi et al. . |
| 4,193,434 | 3/1980 | Wagner . |
| 4,238,165 | 12/1980 | Wagner . |
| 4,306,708 | 12/1981 | Gassaway et al. . |
| 4,334,599 | 6/1982 | Ritsema et al. . |
| 4,348,140 | 9/1982 | Bergholz et al. . |
| 4,430,033 | 2/1984 | McKewan ......................... 411/437 |
| 4,435,112 | 3/1984 | Becker .............................. 411/368 |
| 4,621,961 | 11/1986 | Gulistan . |
| 4,655,656 | 4/1987 | Jonsson . |
| 4,701,088 | 10/1987 | Crull . |
| 4,702,657 | 10/1987 | Jelinek . |

(List continued on next page.)

FOREIGN PATENT DOCUMENTS

| | | |
|---|---|---|
| 2423517 | 11/1975 | Germany . |
| 481228 | 4/1938 | United Kingdom . |
| 1218206 | 1/1971 | United Kingdom . |

*Primary Examiner*—Lowell A. Larson
*Assistant Examiner*—Ed Tolan
*Attorney, Agent, or Firm*—Wood, Herron & Evans, LLP

[57] ABSTRACT

A preassembled fastener assembly having a washer axially captivated on a threaded screw. The washer includes an elongated cylindrical sleeve, a radially outwardly directed flange and at least two inwardly extending detents within the sleeve to yieldably engage a shoulder on the threaded screw to hold the parts together. The detents are provided with elongated flattened inwardly extending surfaces. When assembled, the screw tip extends substantially outward of the washer sleeve and beyond the grommet. Methods of forming the detents are disclosed.

5 Claims, 4 Drawing Sheets

U.S. PATENT DOCUMENTS

| | | |
|---|---|---|
| 4,705,285 | 11/1987 | Yoshida . |
| 4,732,519 | 3/1988 | Wagner . |
| 4,975,008 | 12/1990 | Wagner . |
| 4,995,777 | 2/1991 | Warmington ............... 411/533 |
| 5,040,917 | 8/1991 | Camuffo . |
| 5,094,579 | 3/1992 | Johnson . |
| 5,139,361 | 8/1992 | Camuffo . |
| 5,154,559 | 10/1992 | Wagner . |
| 5,244,325 | 9/1993 | Knohl . |
| 5,255,647 | 10/1993 | Kiczek . |
| 5,308,285 | 5/1994 | Malen et al. . |
| 5,328,311 | 7/1994 | Knohl . |

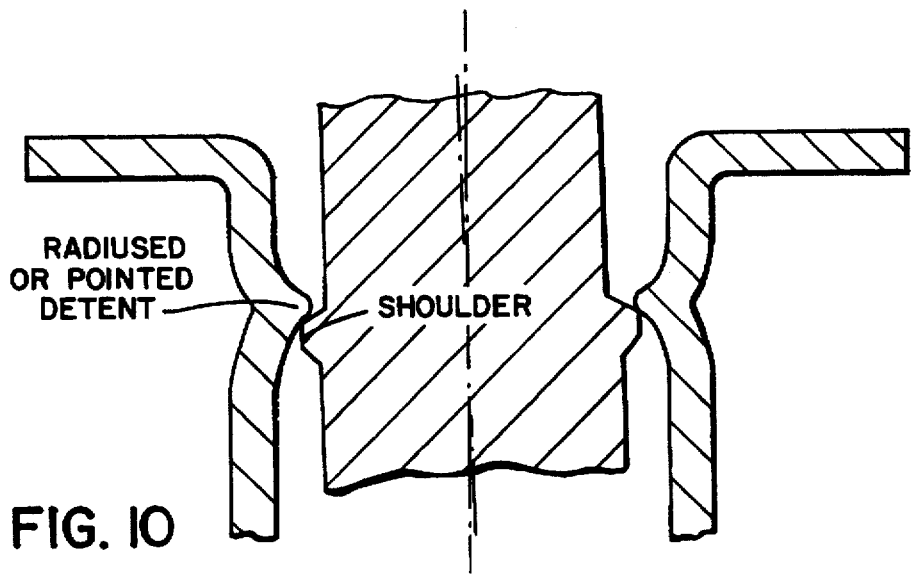
FIG. 10
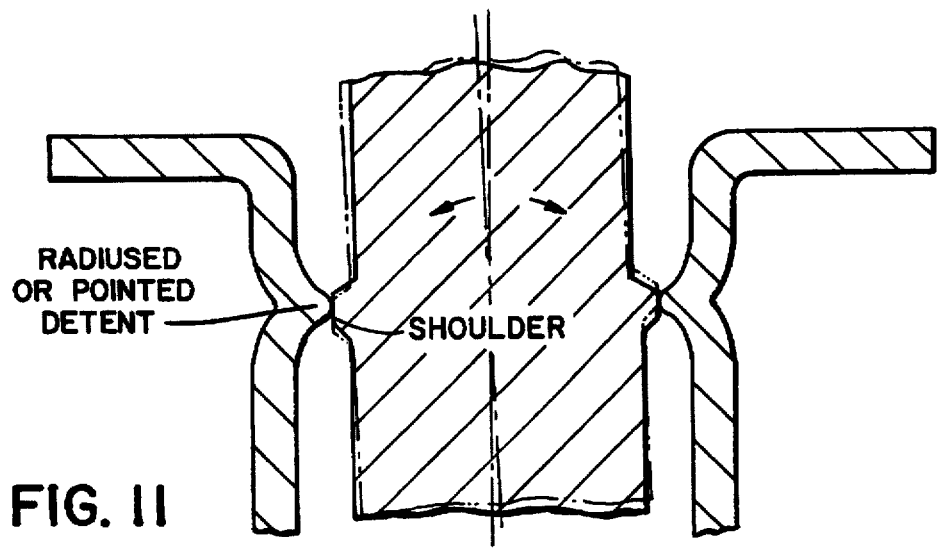
FIG. 11
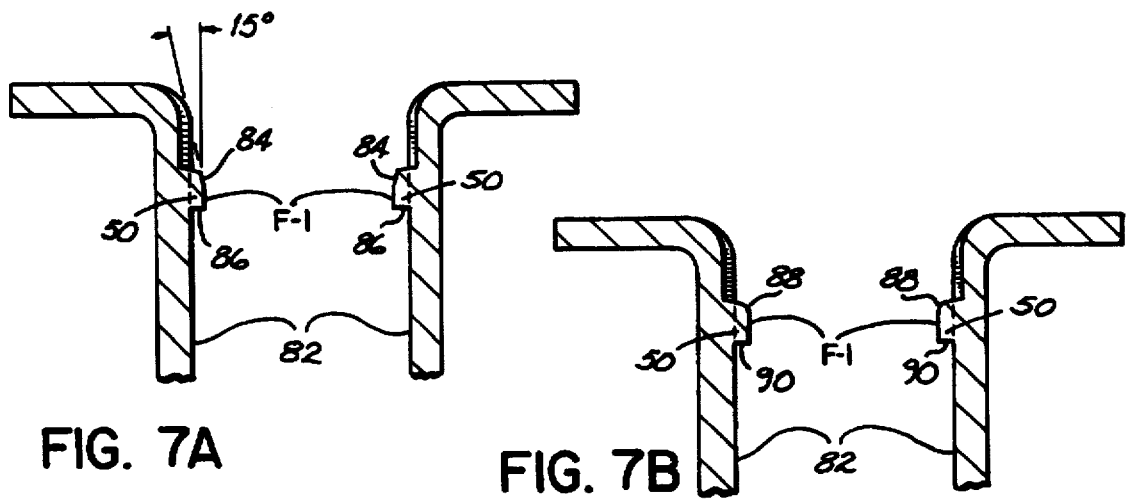
FIG. 7A
FIG. 7B

METHOD OF MANUFACTURING A FASTENER ASSEMBLY WITH AXIALLY CAPTIVATED WASHER

This application is a divisional of application Ser. No. 08/254,644 filed Jun. 8, 1994, now U.S. Pat. No. 5,489,177.

BACKGROUND OF THE INVENTION

The present invention relates generally to threaded fastener assemblies and, more particularly, to a threaded screw and washer combination which is adapted to be preassembled with the washer axially captivated on the screw shank.

Past fastener assemblies having a washer axially captivated on a screw shank are generally known. Such previous designs are shown, for example, in U.S. Pat. No. 4,732,519 issued to Wagner and in U.S. Pat. No. 5,244,325 issued to Knohl. Wagner shows a threaded screw and washer combination wherein a pair of radially outwardly extending wing protuberances are specially forged on the screw to axially captivate the washer. The washer includes a tubular sleeve having a radially inwardly extending continuous annular bead at its uppermost extremity which is adapted to snap over the wing protuberances of the screw.

In another prior art fastener, detents having radiused or rounded inwardly facing surfaces are provided in the washer below its uppermost end by a tool punching inwardly from the outer surface of the sleeve. These detents block the annular shoulder of a screw, forcibly inserted in the washer, from backing out.

Fastener assemblies of these designs, however, have several inherent problems, including the potential that, in the first case, the ring in the sleeve will deform the wings on the screw when the parts are assembled together. As a result, the mashed or deformed wing protuberances of the screw may not provide sufficient blocking for the washer which could separate axially from the screw.

Knohl discloses a screw and washer combination wherein a spring retainer clip made out of resiliently yieldable material is adapted to be forcibly installed about the screw after the washer and screw have been preassembled. In this way, the retainer clip prevents the washer from slipping off the screw. With this design, however, additional manufacturing and assembly of the retainer clip are required before the fastener assembly can be preassembled.

In the other prior assembly, the radiused detents were found not to be consistently effective at preventing screw withdrawal. The radius provided a means by which "jiggling" or tilting manipulation of the screw could wedge the shoulder between the detents and it could "walk" out of the sleeve. Also, on assembly, the radiused or pointed detents could deform the softer screw shoulder surface, creating reliefs in the screw shoulder through which the detents could retract, permitting screw and washer separation. In other words, it is desirable to provide a significant or substantial abutting overlap of detent to shoulder after assembly. The radiused detents, however, tend to deform the screw shoulder permanently upon assembly, reducing any subsequent overlap when the detents later align on the shoulder with deformed areas and leading to a greater likelihood of separation than is desired.

Accordingly, there is a need for a new fastener assembly having a preassembled screw and washer combination which provides for a reliable interference fit between the screw and washer such that the fastener assembly consistently does not separate during handling. It is also desirable to reduce the number of parts and special manufacturing and assembly steps in the manufacture of screw and washer assemblies, as compared to certain prior assemblies.

SUMMARY OF THE INVENTION

To these ends, the present invention comprises a preassembled fastener assembly having an elongated screw and a washer whereby the washer is provided with "clinches" or detents and is captivated by a shoulder on the screw while permitting sliding axial movement of the washer relative to the screw. The detents are formed so as to provide a flat or longitudinally extended inwardly facing surface.

The screw includes a shank portion having a driving head at one end and an entering tip at an opposite end thereof. The shank portion further includes a threaded portion extending between the driving head and tip and an unthreaded portion extending between the head and the threaded portion. A shoulder is disposed intermediate the threaded and unthreaded portions. The shoulder has a diameter which is greater than the diameters of either the threaded and unthreaded portions, and greater than the diameters or distances between the flat, inwardly facing surfaces of the detents.

The washer includes an elongated cylindrical sleeve of predetermined inner diameter, a first radially outwardly directed flange of predetermined outer diameter extending from one end of the sleeve and at least two inwardly extending coined or skived clinches or detents disposed within the sleeve proximate and below the one end and the flange. The detents have substantially flat, innermost surfaces, extending in an axial direction, lying in a circle to define an inner "detent" diameter which is less than the inner diameter of the sleeve and greater than the diameters of the threaded and unthreaded portions of the screw. The shoulder has a diameter which is greater than the "detent" diameter and less than the inner diameter such that the detents yieldably engage and permit passage of the shoulder when the screw is forcibly inserted into the washer. In this embodiment, the washer is axially captivated by the screw along the shank portion between the driving head and the shoulder.

Substantial overlap, accommodated or provided by sleeve elasticity and temporary sleeve deformation on assembly (rather than screw shoulder deformation), inhibits later screw separation. Moreover, the flat detent surface significantly inhibits any tilting motion of the screw relative to the sleeve tending to permit axial displacement of the shoulder relative to the detents.

In another aspect of this invention, the inwardly extending coined detents are asymmetrically spaced within the sleeve. This helps to render part separation highly unlikely.

In still another aspect of the invention, the washer is provided with a second radially outwardly directed flange of predetermined outer diameter extending from a lowermost extremity of the sleeve. The second flange preferably has a diameter less than the first flange diameter, although it could be greater.

In a further aspect of the invention, an annular grommet made of elastic material is provided on the sleeve below the first flange and encircling the sleeve.

The invention is particularly advantageous in applications requiring an upper workpiece to be joined with a lower workpiece such as in the automotive industry, for example, where a plastic valve cover is be joined to an engine block.

In a further aspect of the invention, a method of making the washer and detents therein incorporates a two part step.

A first tool is used to upset metal in the sleeve, forming a pointed or even radiused inward surface. A second tool having detent forming shoulders wipes off the points or radiused portions of the detent to form flattened inwardly facing detent surfaces.

BRIEF DESCRIPTION OF THE DRAWINGS

FIG. 10 is an illustrative cross-section of a prior art device having rounded detents;

FIG. 11 is an illustrative cross-section similar to FIG. 10, but showing the screw in a different position.

DETAILED DESCRIPTION OF THE PREFERRED EMBODIMENTS

Figure 1:
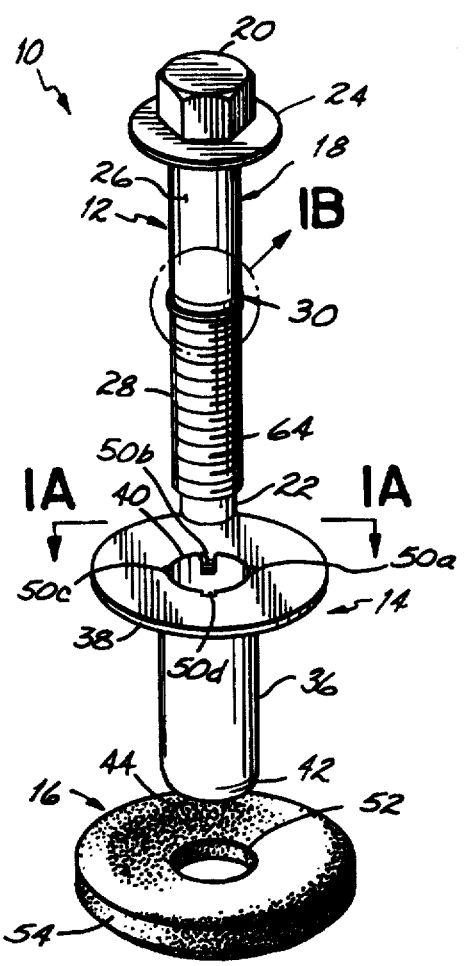
FIG. 1 is an exploded perspective view of the fastener assembly of the present invention.
Figure 3:
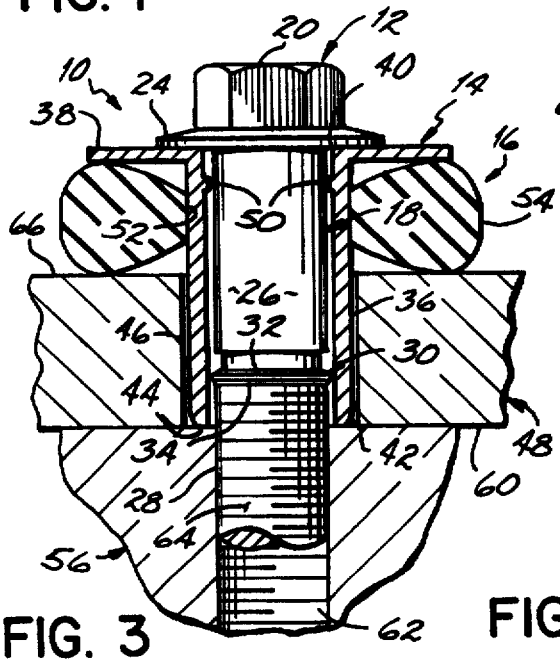
FIG. 3 is an enlarged side elevational view, in partial cross-section, of the preassembled fastener assembly similar to FIG. 2 showing the position of the fastener assembly after final installation.
Figure 4:
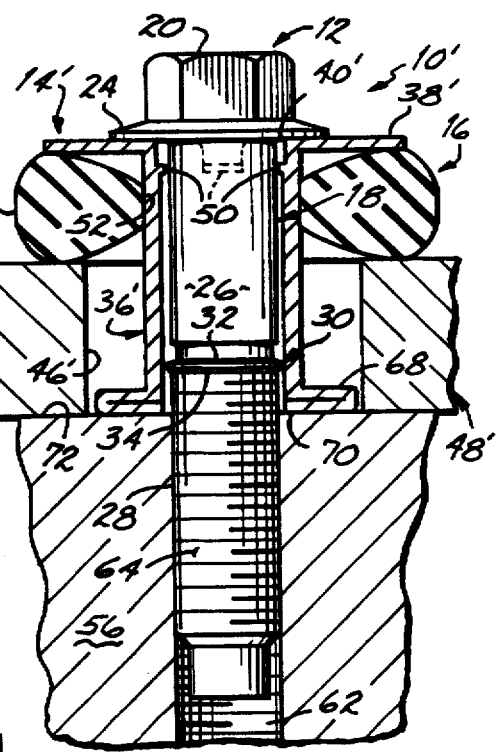
FIG. 4 is a view similar to FIG. 3 but shows a fastener assembly with a modified washer.

Referring now in detail to the drawings, FIG. 1 illustrates a fastener assembly 10 in accordance with the principles of the present invention. Fastener assembly 10 includes an elongated screw 12, a washer 14 and an annular grommet 16 which are adapted to be preassembled as illustrated in FIGS. 2–4.

Figure 8:
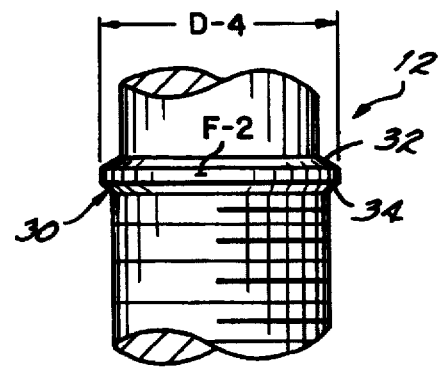
FIG. 8 is an elevational view of a portion of the screw used with the sleeve and illustrating the shoulder in more detail.

Screw 12 includes a shank portion 18 which is intermediate a hexagonal driving head 20 at one end and a tapered entering tip 22 disposed at the remote end of screw 12. Driving head 20 includes an integral load-bearing skirt 24 which urges fastener assembly 10 downwards in use (or in a direction toward the tip 22) when driving head 20 is rotated and thereby tightened. Shank portion 18 further includes an upper unthreaded portion 26 of predetermined axial length and diameter extending below driving head 20, a lower threaded portion 28 (helical thread) extending between entering tip 22 and unthreaded portion 26, and a radially outwardly extending shoulder 30 which is disposed intermediate unthreaded portion 26 and threaded portion 28. Preferably, shoulder 30 is conventionally ring-rolled on shank portion 18 and includes an upwardly facing abrupt surface 32 (FIG. 1B) and a downwardly facing frustoconical surface 34 such that shoulder 30 has a diameter greater than the diameters of upper unthreaded portion 26 and lower threaded portion 28 for purposes as will be described in more detail below. Further details of the shoulder are illustrated in enlarged views in FIGS. 1B, 8 and 9.

Figure 2:
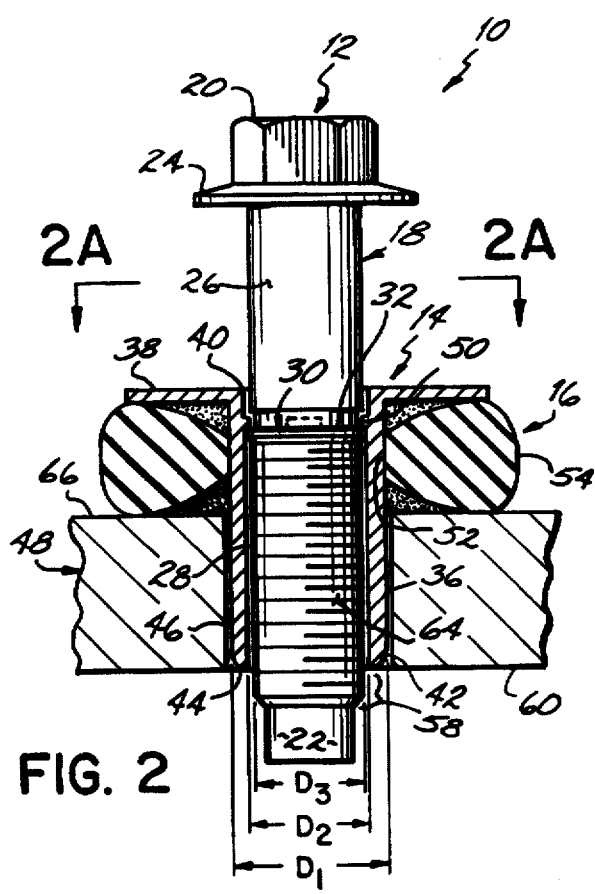
FIG. 2 is an enlarged side elevational view, in partial cross-section, of the preassembled fastener assembly in a workpiece showing the position of the fastener assembly before final installation.

With further reference to FIG. 1, washer 14 includes an elongated cylindrical sleeve 36 having an outer surface with diameter $D_1$ and an inner surface with diameter $D_2$ (see FIG. 2). The sleeve 36 includes a first radially outwardly directed flange 38 of predetermined outer diameter extending from an uppermost extremity 40 of sleeve 36. Preferably, cylindrical sleeve 36 includes an inwardly tapering outer surface 42 at a free end 44 opposite flange 38 to facilitate placement of grommet 16 onto sleeve 36 and entry of fastener assembly 10 into cylindrical hole 46 of a workpiece 48 (FIG. 2) prior to final assembly. It will be appreciated, however, that sleeve 36 could be of uniform thickness without deviating from the principles of this invention. Also, it should be appreciated that sleeve 36 is preferably made of material harder than screw 18 and it could be hardened. For example, sleeve 36 could be made of metal with a Rockwell "C" hardness of RC-40, while screw 12 is made of metal with a Rockwell "C" hardness of RC-30.

Washer 14 further includes preferably four inwardly extending coined detents 50a–50d disposed within sleeve 36 proximate but below uppermost extremity 40. Coined or skived detents 50 are stamped or upset in the inner surface of diameter $D_2$ of sleeve 36 using stamping techniques further described herein and define an appropriate detent diameter or distance $D_3$ (see FIG. 2) which is slightly less than inner diameter $D_2$ for purposes as will be described in more detail below. This is a measure from the innermost extending portion of a detent to that of the most nearly opposing detent, i.e., detent 50a to detent 50c and detent 50b to detent 50d. It is understood that a greater or lesser number of detents is possible within sleeve 36 without deviating from the principles of this invention.

While four detents 50 are shown in the preferred embodiment of the drawings, at least two detents should be used. In the case of an odd number of detents, or where the detents are offset or disposed asymmetrically, the distance D-3 is the "detent" diameter of an imaginary circle including the inwardly facing surfaces F-1 of the detents.

It should also be understood that while applicant has referred to the "detent" diameter $D_3$" for purposes of description, the detents define in part, either with other detents or portions of the inner surface of sleeve 36, a constricted opening for accommodating passage of shoulder 30 on screw 18, and for thereafter resisting any reverse passage of shoulder 30 back through the opening. Accordingly, the detents define in part a constricted opening in a plane transverse to the sleeve and smaller than shoulder 30. Further details of the actual detents are better seen in the enlarged figures such as FIGS. 1A, 2A, 7 and 9.

As may be seen in FIG. 1a, detents 50 are preferably asymmetrically spaced within sleeve 36 for purposes as will be described in more detail below. In this way, for example, detent 50a is circumferentially spaced 95 degrees from detents 50b and 50d whereas detent 50c is circumferentially spaced 85 degrees from detents 50b and 50d. It is appreciated that different angles of circumferential spacing are possible without deviating from the principles of this invention.

Again referring to FIG. 1, annular grommet 16 is made of rubber or other elastic material and is generally in the form of an O-ring having a slightly flattened cross-section (FIGS. 2–4). Grommet 16 has an inner aperture 52 having a diameter which is slightly less than the outer diameter $D_1$ of sleeve 36 such that grommet 16 is adapted to be radially stretched over and about sleeve 36 and fitted securely and snugly below first flange 38 when fastener assembly 10 is in use (FIGS. 2–4). Grommet 16 further includes an outer periphery 54 having a diameter preferably equal to or slightly greater than the diameter of first flange 38 for elastic cooperation between first flange 38 and upper workpiece 48 when fastener assembly 10 is fully tightened (FIGS. 3–4). Alternately, the outer periphery of the grommet 16 may be sized to frictionally engage the sidewalls of a bore into which the assembly 10 is inserted.

As may be seen in FIGS. 2–4, fastener assembly 10 is adapted to be preassembled such that washer 14 is axially captivated on shank portion 18. In this way, a plurality of fastener assemblies 12 (one shown) can be inserted into a plurality of cylindrical holes 46 (one shown) of upper workpiece 48 without screw 12 becoming separated from washer 14 during handling. Such a fastener assembly design is desirable, for example, in automotive assembly applications for joining an upper workpiece 48 (such as a plastic valve cover) to a lower workpiece 56 (such as an engine block) (see FIGS. 3–4).

With reference to FIG. 2, fastener assembly 10 is preassembled by forcibly inserting screw 12 into washer 14. Entering tip 22 and lower threaded portion 28 have diameters less than inner diameter $D_2$ and detent diameter $D_3$. Shoulder 30 has a diameter greater than detent diameter $D_3$ and less than inner diameter $D_2$. As a result, screw 12 slides freely into sleeve 36 until downwardly facing frusto-conical surface 34 abuts inwardly extending coined detents 50. Detents 50 are preferably disposed proximate but below uppermost extremity 40 to yieldably engage shoulder 30 as screw 12 is urged into washer 14 such that surface 34 rides over and beyond detents 50 to axially captivate washer 14. In this embodiment, detents 50 are positioned within a radially elastic region of sleeve 36 to reduce deformation of shoulder 30 as screw 12 is forcibly inserted into washer 14. In preassembled arrangement, the upper extremity of washer 14 is slidable axially along shank portion 18 between driving head 20 and shoulder 30 (FIGS. 2–3) with screw 12 being freely rotatable within washer 14.

Figure 1A:
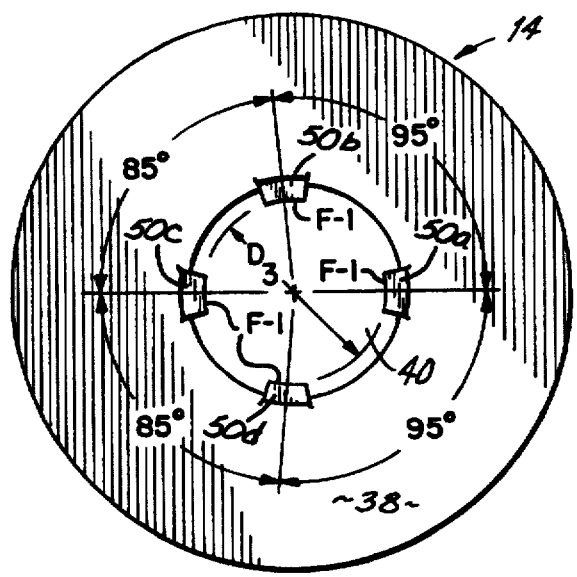
FIG. 1A is an enlarged plan view of the washer in FIG. 1 taken along lines 1A—1A.
Figure 1B:
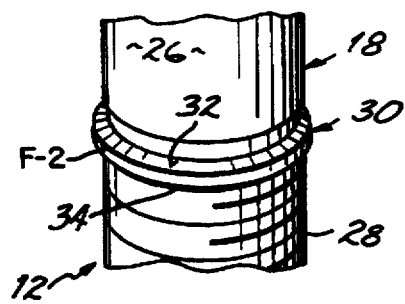
FIG. 1B is a perspective view of the area 1 B of FIG. 1 illustrating the shoulder of the fastener screw of FIGS. 1–4.

With asymmetrical spacing of detents 50a, 50b, 50c and 50d, as shown in FIG. 1a, washer 14 is adapted to provide a reliable interference fit with shoulder 30 during handling of fastener assembly 10. Upon forcible insertion of screw 12 into washer 14, shoulder 30 will deform, if at all, in discrete upset sections 50a', 50b', 50c' and 50d' in register with detents 50a, 50b, 50c and 50d, respectively, as shown diagrammatically in FIG. 2a. In this way, shoulder 30 provides a load-bearing area of interference to detents 50a, 50b, 50c and 50d in any degree of rotation of screw 12 except when upset sections 50a', 50b', 50c' and 50d' align or register exactly with detents 50a, 50b, 50c and 50d, respectively. Shoulder 30 provides a somewhat lesser load bearing area when the sections and detents are aligned, if the assembly process wipes off any parts of the shoulder, but there is still enough interference overlap to prevent the screw from backing out of the sleeve. With the detents being formed below the plane of flange 38, however, the elasticity of the sleeve substantially eliminates or reduces the assembly deformation of shoulder 30. The sleeve elasticity yields to non-circular shape during assembly, then returns to its original shape to produce substantial, non-yielding, post assembly overlap between shoulder 30 and detents 50 even when the detents are later aligned with the shoulder as in assembly.

In operation as seen in FIG. 2, preassembled fastener assembly 10 is inserted in cylindrical hole 46 of upper workpiece 48 having a diameter substantially equal to the outer diameter $D_1$ of sleeve 36. Grommet 16 is disposed intermediate first flange 38 and upper workpiece 48 to provide a fluid seal between flange 38 and upper workpiece 48. In this position, screw 12 is held in assembled relationship with washer 14 while permitting sliding axial movement of washer 14 relative to screw 12. When screw 12 is retracted as shown in FIG. 2 such that upwardly facing abrupt surface 32 of shoulder 30 abuts inwardly extending detents 50, a substantial portion 58 of lower threaded portion 28, and tip 22, extends beyond tapered end 42 of sleeve 36 and lower surface 60 of upper workpiece 48. As a result, portion 58 of screw 12 serves as a pilot to facilitate alignment of upper workpiece 48 with lower workpiece 56 during final assembly as will be described in more detail below. Thus when the screw 12 and washer 14 are assembled, the screw extends substantially outwardly of sleeve 36 and beyond grommet 16.

With reference to FIG. 3, fastener assembly 10 of FIG. 2 is seen joining an upper workpiece 48 to a lower workpiece 56 such as, for example, a plastic valve cover to an engine block, respectively. Lower workpiece 56 is provided with a plurality of tapped holes 62 (one shown) which meshingly engage helical threads 64 of lower threaded portion 28. Upper workpiece 48 is fixedly joined to lower workpiece 56 upon rotation of hexagonal driving head 20 such that load-bearing skirt 24 engages first flange 38. First flange 38, in turn, urges annular grommet 16 upon upper surface 66 of upper workpiece 48 such that upper workpiece 48 and lower workpiece 56 are joined. Grommet 16 slightly flattens thereby to form a fluid seal between first flange 38 and upper workpiece 48. In this position, helical threads 64 extend upwardly above tapered end 42 of sleeve 36 and lower surface 60 of upper workpiece 48. Also, lower end 42 engages the surface of workpiece 56 to prevent undue compression of workpiece 48.

In an alternative embodiment as shown in FIG. 4, a fastener assembly 10' is provided with a generally spool-like washer 14' having a first radially outwardly directed flange 38' of predetermined outer diameter extending from an uppermost extremity 40' of sleeve 36' and a second radially outwardly directed flange 68 extending from a lowermost extremity 70 of sleeve 36'. Preferably, second flange 68 has a diameter substantially less than first flange 38' for reasons discussed in more detail below. Apart from flange 68, the assembly 10' is like that assembly 10 of FIGS. 1–3.

In use as shown in FIG. 4, fastener assembly 10' is preassembled as described above with reference to FIG. 2 such that washer 14' is axially captivated on elongated screw 12. A plurality of fastener assemblies 10' (one shown) are placed in a plurality of cylindrical holes 46' (one shown) of upper workpiece 48' having a diameter substantially equal to the outer diameter of second flange 68. Upon proper registration of upper workpiece 48' with lower workpiece 56 such that entering tip 22 and portion 58 (not shown) engage tapped hole 62, driving head 20 is rotated to urge load-bearing skirt 24 upon first flange 38'. First flange 38', in turn, urges annular grommet 16 upon upper surface 66' of upper workpiece 48' and second flange 68 upon upper surface 72 of lower workpiece 56 such that upper workpiece 48' and lower workpiece 56 are joined. Grommet 16 slightly flattens thereby to form a fluid seal between first flange 38' and upper workpiece 48'. In this embodiment, the flange 68 engages surface 72 and further tensioning of screw 12 is accommodated by sleeve 36 and grommet 16 so undue force is not transmitted to the workpiece 48.

In an alternative to FIG. 4, the workpiece 48 may be thicker and have a stepped-down bore, with the lower side of the grommet 16 engaging surface 66' and the periphery of grommet 16 engaging a cylindrical wall surface of a larger portion of the stepped bore.

It will be appreciated that the shoulder 30 on screw 12 provides a continuous bearing surface for interference fit with washer 14. Shoulder 30 is much less subject to deformation, during preassembly of screw and washer, than would be discontinuous or discrete projections extending from the screw. Thus the use of shoulder 30 is, in itself, more useful in preventing undesirable separation of screw and washer. Use of the shoulder 30 thereby reduces loss of interference fit for part retention.

Since the detents or clinches 50 are provided in the sleeve, only parts of the shoulder 30 are subject to deformation during part preassembly. Thus less deformation, if any, of the screw features are realized.

Moreover, the asymmetric orientation of detents taken with the free rotation of washer 14 with respect to screw 12 results only in an unlikely random event registration of sleeve detent 50a–50d to corresponding deformation 50a'–50d'. The detents 50a–50d would have to line up exactly in a single angular register before the parts could be more easily or inadvertently separated due to a lesser area of interference. This further reduces the post assembly separation of screw and washer.

Also, since the detents are disposed in the barrel of the sleeve, spaced from the flange 38, the detents are in a more elastic part of the sleeve than at the flange plane, and are more likely to move outwardly during preassembly, the sleeve slightly expanding to accommodate the shoulder 30, and deforming the shoulder less than if the detents were disposed in the sleeve at a position of greater "hoop strength", i.e., in the plane of flange 38.

Since the detents place only discrete load points on the sleeve during assembly, the sleeve can more easily assume a stress-relieving, non-round shape during assembly. This also reduces deformation, and helps to insure integrity of the retention of the sleeves on the screw. Accordingly, even if shoulder 30 is deformed during preassembly, there is likely insufficient deformation to permit such part separation even if screw and washer randomly assume an assembly process register.

In another aspect of the invention, the particular shape of the detents 50 has been found to be important to assembly and to ultimate screw retention. While the detents 50 are illustrated for position in FIGS. 1–4, their particular shape is shown in more detail in FIGS. 1A, 2A, 7 and 9. Such shape, when used with the screw shown, may eliminate any shoulder deformation caused by assembly, thus increasing the ability of the washer to prevent screw separation.

Figure 9:
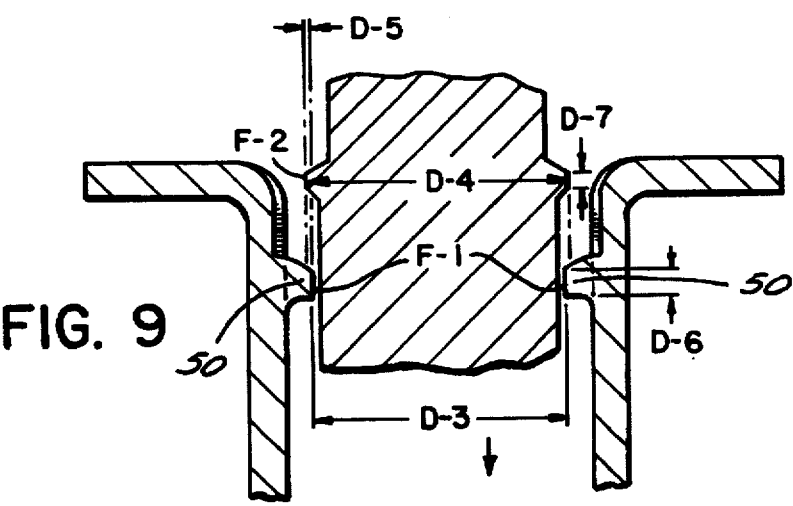
FIG. 9 is a cross-sectional view illustrating certain features of the nearby assembled fastener as shown in FIGS. 7 and 8 in enlarged form for illustration.

In particular, each detent is formed with an inwardly facing, longitudinally extending, slightly concave surface F-1 while shoulder 30 has an outwardly facing longitudinally directed circumferential or convex surface F-2. These are shown in FIG. 9. While the surfaces F-1 are slightly concave as shown, they can be referred to as substantially "flattened" in the longitudinal or axial direction of the sleeve. The detent diameter or distance between the most nearly opposite detent surfaces F-1 is D-3, while the diameter or distance between opposite sides of shoulder surface F-2 is D-4. Distance D-4 is greater than distance D-3 by approximately twice the overlap distance D-5 (at each detent/shoulder interface).

Also, the detent surface F-1 extends a longitudinal or axial distance D-6, while shoulder surface F-2 extends a longitudinal or axial distance D-7 as shown in FIG. 9.

The flattened or extended surfaces F-1 provide, in conjunction with screw shoulder 30, numerous advantages over a pointed or radiused surface convex detent. More particularly, when such a radiused, convex shaped detail surface is used, such detent of the harder sleeve material is more likely to deform shoulder 30, or "wipe" relieved areas therein. On the other hand, the "flattened" inward surface F-1 of the detents do not apply the same deformation pressures to the shoulder 30 and do not deform it or "wipe" it to the same degree, thereby resulting in more interfering overlap between shoulder 30 and detents 50 after assembly. Thus, during assembly, passage of the shoulder by the detents is more likely accommodated by elastic sleeve deformation than permanent shoulder deformation. This provides more significant or substantial detent to shoulder overlap after assembly, even when detents are aligned with the screw shoulder as when assembled. Thus, even after assembly, the screw 12 is less likely to separate from sleeve 36, even if the detents 50 and any deformed areas in the shoulder 30 are aligned.

Moreover, and turning briefly to FIGS. 10 and 11, FIG. 10 illustrates how the use of a radiused or convex detent will permit excessive tilting or cocking of the screw axis a with respect to a sleeve axis.

Such tilting, cocking or manipulation such as the jiggling seen in shipping or handling of the fastener, may allow the radiused detent to get a purchase on the screw shoulder, thereby holding it in a "cocked" fashion. Subsequent tilting back and forth may result in a "walking" of the screw out of the sleeve, as illustrated in FIG. 11.

At the least, the screw must be released, perhaps manually, from its "cocked" position before the fastener can be used.

Thus, the radiused detent results in both the unwanted introduction or wedging of the screw shoulder between the detents (FIG. 10), and the subsequent "walking" of the shoulder between detents to separation (FIG. 11).

On the other hand, the detent 50 is much more pronounced and does neither. There is no significant propensity of any screw tilting to cause shoulder 30 to wedge between detents. Also, the longitudinal or axial extension of the surfaces F-1 and F-2 severely restrict any tilting or "walking", even if the shoulder 30 was forced between detents.

Figure 5:
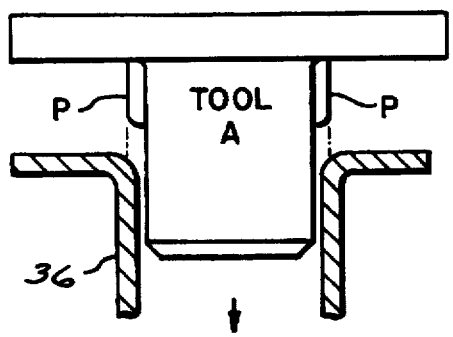
FIG. 5 is a diagrammatic view illustrating initial formation of the sleeve detents.

In the manufacture of detents 50 in sleeve 36, a two-step stamping process is preferably used. A first step is illustrated in FIG. 5 where a first tool A, having plows P, is driven in the direction of the arrow into the sleeve 36 preform. Plows P have surfaces spaced apart further than distance D-2 to skive, upset or push metal longitudinally in the inner surface of the sleeve. The displaced metal moves longitudinally and inwardly to form detents. The pointed or radiused detents so formed by the upset metal are illustrated in FIG. 6.

Figure 6:
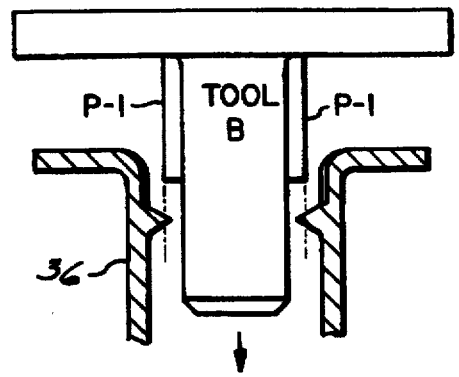
FIG. 6 is a diagrammatic view illustrating a second step in the formation of the sleeve detents.
Figure 7:
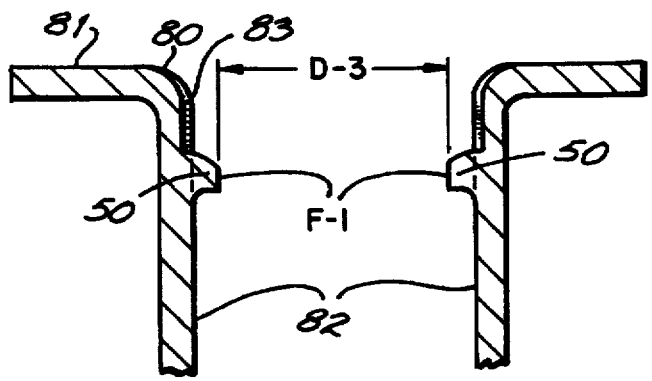
FIG. 7 is an enlarged cross-sectional view of one end of the sleeve illustrating the finally formed detents which are shown in exaggerated size for illustration.

A second tool B as shown in FIG. 6 with plows P, is then driven into sleeve 36, in the direction of the arrow, to skive or wipe off or "flatten" the detents to produce the longitudinally concave surfaces F-1 therein. Thus the points or radiused sections of the detents produced by tool A are wiped off or "flattened" by tool B. This creates a longitudinal "flat" on the inward facing detent in excess of any such surface which might be produced, for example by a softer screw shoulder on a radiused or pointed detent. The detent so formed has sharply defined edges, both along the sides and more importantly, transversely across the detent, defining the edges of the flat or the surface F-1.

It will be appreciated that the juncture of the sleeve 36 and flange 38 is slightly rounded. That is, the juncture at 80 transitioning from the upper surface 81 of the flange 38 to the inner surface 82 of the sleeve 38 (FIG. 7) is rounded. Thus, the plows of the first tool A engage and begin to upset or deform material from the inner surface 82 of sleeve 36 just at, in some cases perhaps slightly below, the flange plane defined by the flange 38. This deformation or upset leaves a depression 83 in the inner surface 82. Material from this area is moved longitudinally by the plow to form or comprise at least a portion of the detents 50.

It will also be appreciated that during the application of both tools A and B to the sleeve, the sleeve is preferably supported in a die or tool (not shown) underlying the flange and supporting the outer surface of the sleeve.

It should also be appreciated that the second tool might be eliminated by proving the first tool with a plow on its lower end so as to wipe a flattened surface on the pointed detent as the tool is withdrawn. Such a plow would have an enlarged effective working diameter greater than the diameter defined by the pointed detents but less than the distances D-2 and D-4.

When the shoulder 30 of screw 12 is forced past the preferred detents 50 upon assembly, passage is accommodated more by the elastic temporary deformation of the sleeve, with little or no deformation of the screw. Once the shoulder 30 passes the detents 50, the interfering overlap therebetween (distance D-5 on each side [FIG. 9]) is maximized, thereby significantly reducing or eliminating the separation of assembled screws 12 from sleeves 36.

Figure 2A:
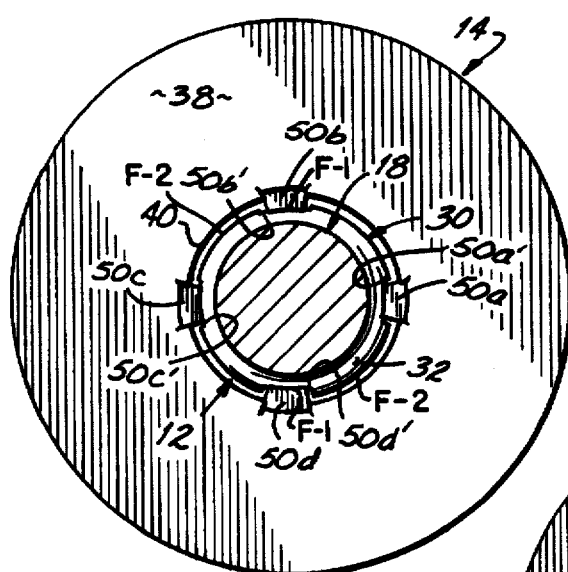
FIG. 2A is a cross-sectional view of the shoulder and washer taken along lines 2A—2A of FIG. 2, showing the relationship of the discrete upset sections of the shoulder relative to the detents of the washer.

In a further alternative embodiment, it will be appreciated that the detents themselves can be made of different widths, rather than being offset as in FIGS. 1A and 2A.

Figure 12:
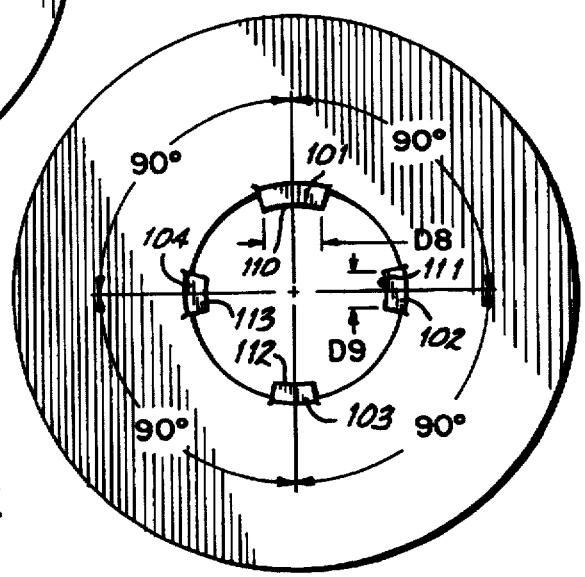
FIG. 12 is similar to FIGS. 1A and 2A but illustrates an alternative embodiment thereto.

For example, FIG. 12 illustrates a washer 100 having detents 101 through 104. These detents are formed like and are like detents 50 in the embodiment described above, but with two exceptions. First, the detents may be symmetrically placed in the sleeve at 90 degree positions (or they may be oriented asymmetrically as described above). Secondly, at least one detent 101 has a surface 110 which is wider at a distance, D-8 (as viewed in FIG. 12) than corresponding surfaces 111-113 of detents 102, 103 and 104 which have a different width distance, D-9, for example. This is produced by forming tools or plow like those described above but with one operating segment being wider for example, than the others. At least one of the detents then has an inwardly facing surface wider than one of the same surfaces on at least one other detent.

With such different widths, even if the detents are aligned after assembly with any deformed shoulder areas, there is only one position out of 360 degrees where the detents would be aligned with any deformed area in the screw shoulder produced by passage of the respective detents thereover during assembly. Any other detent to shoulder alignment, even if the detents were aligned with deformed areas, would be 90 degrees out of phase due to the one wider detent. Moreover, the advantages of the elongated surfaces 110-113 are the same as those described above with elastic sleeve deformation during assembly reducing or eliminating any permanent shoulder deformation and reducing post assembly separation.

Accordingly, the fastener described herein provides for more efficient elastic deformation of the sleeve 36, below the flange 38, to reduce assembly deformation of screw shoulder 30, provides for increased elongation of the inwardly facing detent surfaces F-1 to reduce screw cocking and provides for increased area of interference for all screw/sleeve orientations to prevent or reduce screw/sleeve separation.

Numerous other modifications and advantages of the present invention will become readily apparent to those of ordinary skill in the art without departing from the scope of the invention, and applicant intends to be bound only by the scope of the claims appended hereto.

I claim:

1. In a method of making a sleeve for a fastener assembly, said sleeve having two ends and at least two detents extending inwardly from inner surfaces thereof, the steps of:

inserting a first tool into one end of said sleeve;

plowing sleeve material from the inner surface of said sleeve near one end thereof in an axial direction toward another end thereof, thereby displacing material into said sleeve from said inner surface to form said detents;

withdrawing said first tool; and thereafter inserting a second tool and wiping off portions of said detents to define elongated inwardly facing surfaces thereon.

2. In the method of claim 1 wherein said sleeve has a flange extending radially from one end thereof, the first plowing step comprising:

axially displacing material from the inner surface of said sleeve proximate the juncture of said flange and said sleeve to thereby form said detents.

3. In the method of claim 2 wherein the first plowing step includes:

axially displacing material from the inner surface of said sleeve beginning at the juncture of said flange and said sleeve to thereby form said detents spaced from said flange.

4. In the method of claim 1 including the step of forming at least three detents asymmetrically located about said inner surface.

5. In a method of forming a washer sleeve for a fastener assembly wherein the sleeve has an inner surface and a plurality of detents extended inwardly from said surface, and a flange extending radially from one end of said sleeve, the method comprising the step of:

axially displacing material from an inner surface of said sleeve proximate one end thereof and forming a detent from said material spaced from said end, and forming an elongated substantially flattened, axially extending surface on each said detent.

* * * * *